United States Patent [19]
Isley et al.

[11] 3,916,677
[45] Nov. 4, 1975

[54] PORTABLE LOAD SUPPORTING PLATFORM

[75] Inventors: Loren D. Isley; Richard E. Sipfle, both of Birmingham, Mich.

[73] Assignee: Koehring Company, Milwaukee, Wis.

[22] Filed: Aug. 6, 1973

[21] Appl. No.: 385,745

[52] U.S. Cl. ................................................. 73/71.7
[51] Int. Cl.² .......................................... G01M 7/00
[58] Field of Search ...................... 73/71.6, 71.7, 11; 308/5 R, DIG. 1; 269/20, 59

[56] References Cited
UNITED STATES PATENTS

| | | | |
|---|---|---|---|
| 2,185,791 | 1/1940 | Kroll | 73/71.7 |
| 2,223,576 | 12/1940 | Rasch | 73/71.7 |
| 2,799,158 | 7/1957 | Federspiel | 73/71.7 |
| 3,209,623 | 10/1965 | Schardt | 269/20 X |
| 3,242,724 | 3/1966 | Ceparano et al. | 73/71.6 |
| 3,355,990 | 12/1967 | Thum | 308/5 R X |
| 3,520,180 | 7/1970 | Polhemus et al. | 73/71.7 |

*Primary Examiner*—James J. Gill
*Attorney, Agent, or Firm*—Whittemore, Hulbert & Belknap

[57] ABSTRACT

A portable load support platform including a base having a manifold chamber therein in communication with openings in the bottom thereof, a seal around the periphery of the base of the platform, and means for selectively producing a vacuum or a pressure in the manifold chamber to secure the load support platform in a desired position on a substantially smooth surface or provide an air bearing for the load support platform to facilitate movement of the load support platform over the substantially smooth surface.

6 Claims, 3 Drawing Figures

PORTABLE LOAD SUPPORTING PLATFORM

BACKGROUND OF THE INVENTION

1. Field of the Invention

The invention relates to load support platforms and refers more specifically to an electrohydraulic load support platform for vibration testing of automobiles, including vacuum means for securing the base of the load support platform on a substantially smooth surface in any desired position and pressure means for providing an air bearing beneath the base of the load support platform to facilitate movement thereof over the smooth surface.

2. Description of the Prior Art

In the past, platforms for supporting loads and simulating particular conditions on the loads as, for example, platforms for supporting wheels of an automobile, and simulating road conditions during driving of the automobile by movement of a portion of the platforms, have generally been secured in fixed positions on a floor by means of anchor bolts or the like.

Such load support platforms have the disadvantage of being semi-permanently secured in place so that the platforms are suitable for use only with automobiles having the same wheel spacing dimensions. Also, the movement of such load support platforms in the past to accommodate automobiles having different wheel spacing dimensions has required considerable time and effort due to the weight thereof in addition to the necessity for first releasing the semi-permanent anchorage of the prior load support platforms and again semi-permanently anchoring the load support platforms in a new location.

SUMMARY OF THE INVENTION

In accordance with the invention, an electrohydraulic load support platform for supporting an automobile wheel and simulating vibration in the automobile, such as might occur on driving the automobile, by movement of a portion of the load support platform is provided, which load support platform is provided with vacuum means for securing the base of the load support platform to a substantially smooth surface, and air bearing means for facilitating movement of the load support platform to any position on the surface whereby automobiles with different wheel spacing dimensions are easily accommodated.

DESCRIPTION OF THE PREFERRED EMBODIMENT

Figure 1:
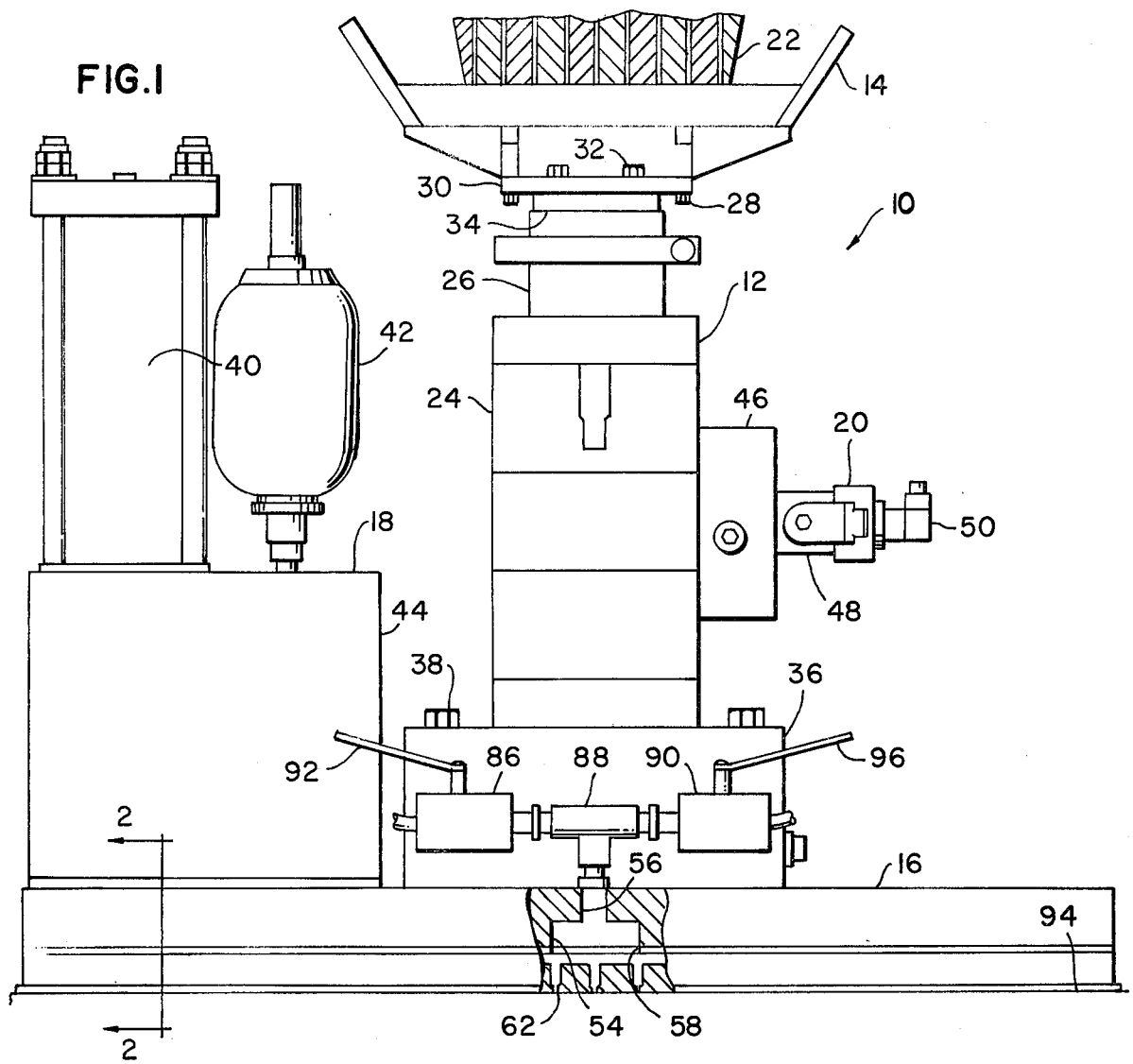
FIG. 1 is a partly broken away elevation view of an electrohydraulic load support platform constructed in accordance with the invention including vacuum means for securing the load support platform to a substantially smooth surface and pressure means for providing an air bearing for facilitating movement of the platform over the surface.

The electrohydraulic load support platform 10 illustrated in FIG. 1 includes a hydraulic actuator 12 for actuating a load receiving tray 14 secured to one end of the actuator 12. The actuator 12 is supported on the platform base 16. Hydraulic conditioning apparatus 18 for conditioning hydraulic fluid in accordance with a predetermined program for actuation of the hydraulic actuator 12, and electrohydraulic servo valve structure 20 for metering hydraulic fluid from the conditioning apparatus 18 to the actuator 12 are also included as part of the load support platform 10.

Hydraulic connections between the conditioning apparatus 18, the electrohydraulic servo valve structure 20, and the actuator 12 have been deleted from the diagrammatic indication of the load support platform 10, as shown, in the interest of clarity. Load support platforms having such connections are well known and it is within the skill of the art to make the appropriate electrical and hydraulic connections to the load support platform 10 and between the elements of the load support platform 10 required for a particular function of the platform such as the producing of movement of the vehicle wheel 22 to simulate movement of the wheel which would occur due to road conditions encountered by the vehicle wheel 22.

More specifically, the actuator structure 12 includes a cylinder 24 in which a hydraulic piston 26 is positioned for vertical movement in accordance with hydraulic fluid metered into and drained from the cylinder 24. The wheel receiving tray 14 is secured to the piston 26 by means of bolts 28 passing through the adapter plate 30 and into the tray 14 in conjunction with the bolts 32 which pass through the adapter plate 30 and spacer plate 34 into the piston 26.

The cylinder 24 is secured at its lower end by convenient means (not shown) to the mounting block 36 which in turn is secured to the base 16 by convenient means such as bolts 38 passing through the mounting block 36 and into the base 16.

The hydraulic fluid conditioning apparatus 18 includes the fluid filter 40 and hydraulic accumulator 42 secured to the housing 44. The housing 44 houses valves, regulators and the like to which hydraulic fluid is supplied for conditioning in accordance with control signals for the hydraulic valves and regulators which are designed to provide hydraulic fluid to the actuator 12 in accordance with a predetermined program which may, for example, be computer controlled, to cause the actuator 12 to move the piston 26 to simulate road conditions for automobile wheel 22.

The conditioned hydraulic fluid from the hydraulic fluid conditioning housing 44 is metered to the actuator 12 through the hydraulic manifold 46 secured to the actuator 12 in accordance with the actuation of the electrohydraulic servo valve 48 and pilot valve 50 of valve structure 20 in accordance with known techniques.

Such known load support platforms are relatively heavy, as for example 1500 pounds, and in the past have been particularly difficult to move about to change the position thereof as indicated above, to accommodate, for example, automobiles having different wheel spacing dimensions.

Further, the usual load support platforms are normally bolted in position on a test floor or the like in a semi-permanent manner so that release of the load support platforms and movement to a new position normally requires a considerable amount of time as well as attaching fixtures such as anchor bolts or the like at different specific locations on the floor.

Thus, in the past, movement of load support platforms to any position on a floor other than positions specifically predesignated by the positioning of anchor bolts, for example, has been impossible without disturbing the floor to place new anchor bolts or the like in new locations, which in itself is a time consuming and undesirable operation.

The load support platform 10, however, is provided with unique structure in the base 16 thereof operable to permit rapid securing of the base of the platform 10 in any desired location on a substantially smooth floor without marring the floor and to facilitate movement of the load support platform to any predetermined location on the floor.

More particularly, the base 16 of the load support platform 10 includes an upper plate 52 having a central opening 54 extending therethrough including a smaller diameter portion 56 and a larger diameter portion 58. The base 16 further includes the lower plate 60 having a plurality of openings 62 extending therethrough spaced over the area thereof. The openings 62 again include a larger diameter portion 64 and a smaller diameter portion 66. The upper plate 52 and lower plate 60 are secured together by conveniently located bolts 68 and are held in spaced apart relation by means of spacing washers 70 to provide a manifold chamber 72 therebetween.

Figure 3:
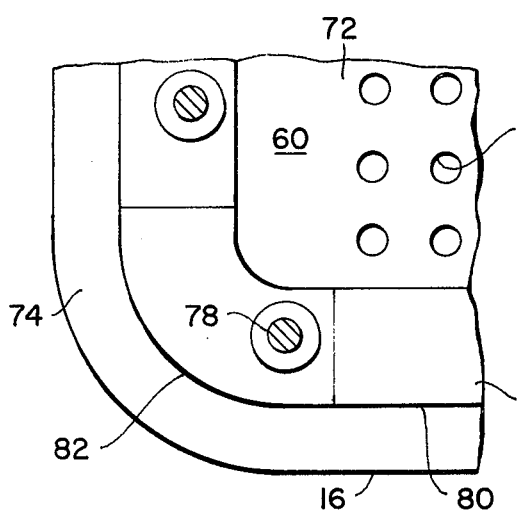
FIG. 3 is an enlarged partial section view of the base of the load support platform illustrated in FIG. 1, taken substantially on the line 3—3 of FIG. 2.
Figure 2:
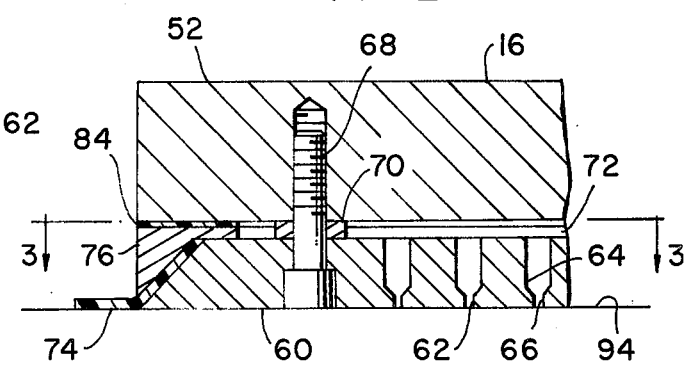
FIG. 2 is an enlarged section view of a portion of the base of the load support platform illustrated in FIG. 1, taken substantially on the line 2—2 in FIG. 1.

A gasket 74 which may be of neoprene or similar material is positioned around the periphery of the bottom plate 60 and is secured in position by means of a clamp 76 which as shown best in FIG. 3 is secured to the upper plate 52 of the base 16 by bolts 78. The clamp 76 may be produced in separate straight sections 80 and corner arcuate sections 82, as shown. The clamp 76, like the neoprene gasket 74, extends entirely around the periphery of the base 16. The neoprene gasket 74, the clamp 76, and a gasket 84, which also extends completely around the periphery of the base 16, provide a seal for the manifold chamber 72 around the periphery of the base 16.

Means 86 for providing air under regulated pressure to the manifold chamber 72 through the opening 54 are connected to one branch of the T connector 88, shown best in FIG. 1. Means 90 for drawing a vacuum in the manifold chamber 72 through the opening 54 are also connected to the upper plate 52 of the base 16 through the T connector 88.

With such base structure, when it is desired to secure the load support platform 10 in a predetermined position on a substantially smooth surface, the means 90 for drawing a vacuum in the manifold chamber 72 is actuated by means of turning the valve handle 96 to draw a vacuum through the opening 54 in the plate 52 of the base 16.

On drawing the vacuum in the chamber 72, the gasket 74 provides an initial seal around the periphery of the base 16, and as the vacuum is drawn, the seal is increased. Considerable holding pressure may thus be provided on the base 16 without marring the floor 94 on which the base 16 is positioned. Further, the vacuum securing of the base 16 to the floor 94 may be accomplished in any position to which the load support platform 10 is moved without marring the floor 94.

When it is desired to move the load support platform 10, the means for drawing a vacuum is disconnected from the opening 54 by again turning the valve handle 96 and air pressure is introduced into the manifold chamber 72 by turning the valve handle 92. The air pressure in the chamber 72 will attempt to dissipate through the openings 62 in the bottom plate 60 of the base 16 and will provide an air bearing beneath the base 16 to facilitate movement of the load support platform. In such manner a load support platform of, for example, 1500 pounds total weight may be easily moved about by a single workman with normal factory air pressure of 60 to 100 pounds per square inch.

Both in drawing the vacuum and in providing the pressure in the manifold chamber 72, it is desirable that the openings 62 form the controlling orifice. It will be noted that the area between the opening 54 and the plenum chamber 72 is larger than the total area of opening of the holes 62.

While one embodiment of the load support platform of the invention has been disclosed in detail, other embodiments and modifications thereof are contemplated. It is the intention to include all embodiments and modifications as are defined by the appended claims within the scope of the invention.

What we claim as our invention is:

1. A universally movable platform for vibration testing of a vehicle comprising a platform base adapted to engage a surface to provide support for the movable platform and movable in any direction in the plane of the surface, means secured to said platform base for supporting at least a part of a vehicle, means connected to the supporting means for vibrating the supporting means, and air pressure control means operably connected to said platform for selectively directing pressurized air between the platform base and surface for facilitating movement of the platform in any direction in the plane of the surface to different positions on the surface, which air pressure control means includes means operably connected to said platform for selectively drawing a vacuum between the platform base and surface to lock the platform base to the surface.

2. Structure as set forth in claim 1 wherein the base of the platform includes a bottom plate and a top plate, spacing and sealing means positioned between the bottom plate and top plate providing a manifold chamber therebetween and wherein the air pressure control means includes an opening through the top plate of the base in communication with the manifold chamber and a plurality of smaller openings through the bottom plate of the base distributed over the area of the base in spaced apart relation.

3. Structure as set forth in claim 2, wherein the effective area of the opening in the top plate into the manifold chamber is larger than the total area of all of the openings through the bottom plate.

4. Structure as set forth in claim 1 wherein the air pressure control means includes a seal around the periphery of the base.

5. A universally movable platform for vibration testing of a vehicle wheel comprising a platform base movable in any direction in the plane of a surface on which the movable platform is located, said platform base having a plenum chamber therein, openings extending from the plenum chamber through the bottom of the base, and means secured to the base for sealing around the periphery of the base between the base and surface with a vacuum drawn in the plenum chamber, piston and cylinder structure having one end secured to the top of the base, a tray for receiving a vehicle wheel secured to the other end of the piston and cylinder structure, electro-hydraulic means connected to the piston and cylinder structure for vibrating the piston within the cylinder, and air pressure control means connected to said base for selectively directing pressurized air through said base to between the base and the surface on which the movable platform is located to facilitate universal movement of the platform over the surface to a predetermined position on the surface, and for selectively drawing a vacuum through the base between the base and surface to lock the platform in a predetermined position on the surface to which it has been moved.

6. The method of vibration testing of a vehicle part on a platform which is universally movable in any direction in the plane of a surface on which the movable platform is located, including structure for receiving the vehicle part, and supporting structure positioned on the base supporting the structure for receiving the vehicle part and for selectively vibrating it, comprising passing air into the base and out of the bottom of the base to between the bottom of the base and the surface, moving the platform over the surface in any direction in the plane of the surface to a predetermined point on the surface with the aid of the air passed between the bottom of the base and the surface, sealing between the base and surface around the periphery of the base, drawing a vacuum between the bottom of the base and surface after the platform has been moved to the predetermined point to lock the platform to the surface at the predetermined point, placing the part of the vehicle in the structure for receiving the vehicle part and vibrating it with the supporting structure.

* * * * *